United States Patent
Kuzuoka

[19]

[11] Patent Number: 5,879,750
[45] Date of Patent: Mar. 9, 1999

[54] METHOD FOR MANUFACTURING THERMISTOR MATERIALS AND THERMISTORS

[75] Inventor: Kaoru Kuzuoka, Toyota, Japan

[73] Assignee: Denso Corporation, Kariya, Japan

[21] Appl. No.: 825,384

[22] Filed: Mar. 28, 1997

[30] Foreign Application Priority Data

Mar. 29, 1996 [JP] Japan ................................. 8-103755

[51] Int. Cl.$^6$ .................................................. H01B 1/08
[52] U.S. Cl. ................................... 427/397.7; 427/376.2; 427/101; 427/126.3
[58] Field of Search .......................... 427/397.7, 376.2, 427/101, 126.3

[56] References Cited

U.S. PATENT DOCUMENTS

| | | | |
|---|---|---|---|
| 4,110,260 | 8/1978 | Yamamoto et al. | 252/519 |
| 4,891,158 | 1/1990 | Hata | 252/518 |
| 5,568,116 | 10/1996 | Iwaya et al. | 338/22 SD |
| 5,610,111 | 3/1997 | Iwaya et al. | 501/136 |

FOREIGN PATENT DOCUMENTS

| | | | |
|---|---|---|---|
| 623 569 | 11/1994 | European Pat. Off. | C04B 35/42 |
| 723 276 | 7/1996 | European Pat. Off. | H01C 7/04 |
| 61-113211 | 5/1986 | Japan | H01C 7/04 |
| 62-25403 | 2/1987 | Japan | H01L 7/02 |
| 5-62805 | 3/1993 | Japan | H01L 7/04 |

OTHER PUBLICATIONS

Patent Abstracts of Japan, vol. 14, No. 5, (E–869) Oct. 1989 re JP 01/253204.

Chemical Abstracts, vol. 109, No. 22, Nov. 1988, Abstract No. 203078 re JP 62/263606.

*Primary Examiner*—Robert Kunemund
*Attorney, Agent, or Firm*—Pillsbury Madison & Sutro LLP

[57] ABSTRACT

The present invention relates a method for manufacturing high-temperature thermistor materials having stable thermistor properties and to a high-temperature thermistor. According to this method the thermistor material is obtained by mixing powders of (Mn.Cr) $O_4$ spinel powder and $Y_2O_3$ powder and firing the mixed powder at a temperature in a range of 1400° to 1700° C., so as to cause the components of the mixture to react with each other, thereby generating $(Mn_x.Cr_y)$ $O_4$ spinel and $Y(Cr.Mn)$ $O_3$ perovskite.

3 Claims, 4 Drawing Sheets

METHOD FOR MANUFACTURING THERMISTOR MATERIALS AND THERMISTORS

BACKGROUND OF THE INVENTION

1. Field of the Invention

The present invention relates to a method for manufacturing high-temperature thermistor materials having widely selectable values of resistivity and temperature coefficients of resistance, and also relates to high-temperature thermistors using the materials.

2. Description of the Related Art

High temperature thermistors are temperature sensors that are employed to measure the flame temperature in a hot water supply, the temperature of a heating furnace or the exhaust gas temperature of a motor vehicle at temperature from about 100° C. to about 1300° C.

In the prior art (Japanese Unexamined Patent Application No. 5-62805), it is shown that thermistor materials for constituting high-temperature thermistor elements are made from a sintered body that is mixed and fired (Mn.Cr) $O_4$ and $YCrO_3$, so that the values of resistivity and temperature coefficient of resistance are selectable over a wide range.

(Mn.Cr) $O_4$ is a high-temperature thermistor material and has a high resistivity and a high temperature coefficient of resistance. On the other hand, $YCrO_3$ is a similar thermistor material and has a low resistivity and a low temperature coefficient of resistance. Therefore, the high-temperature thermistor can be given a desirable resistivity and a suitable temperature coefficient of resistance by suitably varying the mixing ratio of the (Mn.Cr) $O_4$ and $YCrO_3$. The high-temperature thermistor material has a wide range of stable thermistor properties.

However, there are some problems, as follows, in the prior art thermistor materials. Advantageous properties of a thermistor material become possible by uniformly dispersing (Mn.Cr) $O_4$ particles and $YCrO_3$ particles in the material. As mentioned above, because both (Mn.Cr) $O_4$ having better resistivity and better temperature coefficient of resistance and $YCrO_3$ having worse resistivity and worse temperature coefficient of resistance are uniformly mixed and dispersed together throughout the thermistor material, the resistivity and the temperature coefficient of resistance of the thermistor material are homogenized throughout the thermistor material.

Thus, since the bonding force between the particles is not too large, the particles in the above material are liable to gradually separate over time. Because this separated thermistor material may bring about changes in the thermistor properties, the thermistor can not detect an exact temperature.

Therefore, it is not easy to obtain stable thermistor properties from the high-temperature thermistors made of the above prior art material.

SUMMARY OF INVENTION

To solve the above problems, the present invention provides a method for manufacturing high-temperature thermistor materials and high temperature thermistors.

The present invention is directed to a method for manufacturing high-temperature thermistor materials comprising the steps of mixing powders of (Mn.Cr) $O_4$ spinel powder and $Y_2O_3$ powder, and firing the mixed powder at a temperature in a range of 1400° to 1700° C., so as to cause the components of the mixture to react with each other, thereby generating $(Mn_x.Cr_y)$ $O_4$ spinel and Y(Cr.Mn) $O_3$ perovskite, where $0<x$, $y \leq 2$ and $x+y=3$.

To accelerate the reaction of $(Mn_x.Cr_y)$ $O_4$ spinel and Y(Cr.Mn) $O_3$ perovskite, the firing temperature is preferably about 1400° to about 1700° C.

When the firing temperature is less than 1400° C., the bonding force between them may be insufficient. When the above firing temperature is more than 1700° C., an anomalous growth of particles may be proceed during the reaction.

Further, when performing the firing, it is possible to additionally use firing auxiliaries such as $SiO_2.CaO$ and $CaSiO_3$, which are in liquid state in a temperature range of about 1500° C. to about 1650° C.

By employing these firing auxiliaries, it is easy to control the firing or sintering temperature to within a range of 1500° C. to 1600° C. Further, this causes the insulating material volume to be increased in the high-temperature thermistor material, which allows the electric resistance value to be slightly adjustable.

After firing, it is desirable to age the high-temperature thermistor materials for between about 30 to 50 hours at a desired temperature range such as 1000° C. to 1200° C.

By aging the materials, the internal stress is eliminated and the particulates in the materials are rearranged, resulting in a stabilization of the thermistor properties.

(Mn.Cr) $O_4$ is a chemical compound having a crystallographic structure of the spinel type, for example, a composition formula of $Mn_{1.5}Cr_{1.5}O_4$ or $Mn_{1.5+x}Cr_{1.5-x}O_4$ and the like (where $0<x<1.5$).

The manufacturing method of the present invention is described in the following. In order to obtain a thermistor material comprising $(Mn_x.Cr_y)$ $O_4$ spinel and Y(Cr.Mn) $O_3$ perovskite, the present invention can employ (Mn.Cr) $O_4$ spinel powder and $Y_2O_3$ powder as the starting raw materials.

By mixing and firing both powders, some of the Mn atoms and Cr atoms (Mn and Cr ions) in the (Mn.Cr) $O_4$ spinel migrate into the adjacent $Y_2O_3$ and then react with $Y_2O_3$. Thereby, Y(Cr.Mn) $O_3$ perovskite is formed in the fired mixture.

This process can generate a strong bonding force between $(Mn_x.Cr_y)$ $O_4$ spinel and Y(Cr.Mn) $O_3$ perovskite which is not realized in the prior art. This bonding force allows uniform dispersion of $(Mn_x.Cr_y)$ $O_4$ spinel and Y(Cr.Mn) $O_3$ perovskite.

Because the high thermistor material of the present invention is necessarily a uniform mixture of both $(Mn_x.Cr_y)$ $O_4$ spinel and Y(Cr.Mn) $O_3$ perovskite, the thermistor using this material has stable thermistor properties.

As stated above, the present invention provides high-temperature thermistor materials and method for manufacturing thereof.

It is preferable that the concentration of $Y_2O_3$ powder is within the range from 10 to 90 mole % with respect to the total quantity of (Mn.Cr) $O_4$ spinel powder and $Y_2O_3$ powder in the mixed powder.

The mixture of the (Mn.Cr) $O_4$ spinel powder and the $Y_2O_3$ powder within the above range is capable of providing stable thermistor material.

When the added quantity of the $Y_2O_3$ powder is less than 10 mole % and more than 90 mole %, the resistance values of the thermistor material before and after firing are changed remarkably, and the thermistor made from such a material cannot be actually used (see FIG. 2).

Further, when the added quantity of $Y_2O_3$ powder is more than 90 mole %, the sintering properties of the thermistor material is worsened, resulting in the reaction between $(Mn_x.Cr_y)$ $O_4$ spinel and $Y(Cr.Mn)$ $O_3$ perovskite to be insufficient.

Further, the thermistor properties of the $(Mn_x.Cr_y)$ $O_4$ spinel are such that resistivity is as high as about 240 ($\Omega\cdot cm$) and high temperature coefficient of resistance is as high as about 12500(K) at 750° C.

On the other hand, the thermistor property of the $Y(Cr.Mn)$ $O_3$ perovskite formed from $Y_2O_3$ is such that the resistivity is as low as about 0.9 ($\Omega\cdot cm$) and a temperature resistance coefficient is as low as about 1500(K) at 750° C.

Therefore, it is possible to change the thermistor material (as obtained by the mixing followed by firing) by varying the added quantity of $Y_2O_3$.

Further, the components are mixed in a wide range of mixing ratio such that the amount of the each of the components is in a range as wide as 10 to 90 mole %. As a result, it is possible to obtain a thermistor material, the thermistor property of which is selectable over a wide range of resistivities and temperature coefficients of resistance.

It is preferable that the mole ratio of Cr/Mn in the $(Mn.Cr)$ $O_4$ spinel powder in the mixed material is within a range from 0.11 to 9.0.

By employing $(Mn.Cr)$ $O_4$ spinel satisfying the above mole ratio condition, it is possible to obtain a resultant spinel having a small crystalline strain, while a speed of reaction between the $(Mn.Cr)$ $O_4$ spinel and $Y(Cr.Mn)$ $O_3$ perovskite is accelerated, thereby stabilizing the characteristic of the thermistor material as obtained.

When the mole ratio of Cr/Mn is less than 1.1, it is likely that an abnormal diffusion of manganese will occur. On the other hand, when the mole ratio of Cr/Mn is more than 9.0, it is likely that a bonding force between the particles is low due to insufficient reaction.

The $(Mn.Cr)$ $O_4$ spinel powder is obtained by, first, mixing the $MnO_2$ and $Cr_2O_3$ under the above mentioned mole ratio between Cr/Mn, which is followed by the firing at a temperature range, such as 1100° C. to 1300° C., which is followed by the powdering.

The present invention is also directed to a high-temperature thermistor of a laminated structure comprising a ceramic substrate containing alumina, a layer of a high-temperature thermistor material on the ceramic substrate, and a ceramic cover on the thermistor layer, wherein the thermistor material for constructing the thermistor layer comprises $(Mn_x.Cr_y)$ $O_4$ spinel and $Y(Cr.Mn)$ $O_3$ perovskite and is obtained by mixing $(Mn.Cr)$ $O_4$ spinel powder and $Y_2O_3$ powder and firing the mixture at a temperature of 1400° to 1700° C., the concentration of the $Y_2O_3$ powder is within the range from 10 to 90 mole % with respect to the total quantity of the $(Mn.Cr)$ $O_4$ spinel powder and the $Y_2O_3$ powder in the mixed powder, the Mn/Cr mole ratio of the $(Mn.Cr)$ $O_4$ spinel powder in the mixed powder is within a range from 0.11 to 9.0.

When this high-temperature thermistor material is manufactured by the above method, the separation of $(Mn_x.Cr_y)$ $O_4$ spinel and $Y(Cr.Mn)$ $O_3$ perovskite does not occur in the thermistor material. Thereby, it is possible to prevent diffusion of the $(Mn_x.Cr_y)$ $O_4$ spinel into the substrate and the cover containing alumina.

Therefor, high-temperature thermistors of the present invention can provide the stable thermistor properties by the above method.

The present invention also relates to a high-temperature thermistor comprising a metallic tube in which a high-temperature thermistor material is stored, wherein the thermistor material for constructing the thermistor layer comprises $(Mn_x.Cr_y)$ $O_4$ spinel and $Y(Cr.Mn)$ $O_3$ perovskite and is obtained by mixing $(Mn.Cr)$ $O_4$ spinel powder and $Y_2O_3$ powder and firing the mixture at a temperature of 1400° to 1700° C., the concentration of the $Y_2O_3$ powder is within the range from 10 to 90 mole % with respect to the total quantity of the $(Mn.Cr)$ $O_4$ spinel powder and the $Y_2O_3$ powder in the mixed powder, the Mn/Cr mole ratio of the $(Mn.Cr)$ $O_4$ spinel powder in the mixed powder is within a range from 0.11 to 9.0.

This high-temperature thermistor material is manufactured by the above method. Thereby, separation of the $(Mn_x.Cr_y)$ $O_4$ spinel and the $Y(Cr.Mn)$ $O_3$ perovskite does not occur in the thermistor material.

Therefore, the above method is able to provide the high-temperature thermistors having stable thermistor properties.

In an embodiment of the present invention, the high-temperature thermistor can be mounted in a metallic tube. In this case, the thermistor materials is prevented from being directly exposed to oxidation-reduction atmosphere or flames, which otherwise causes the thermistor material to be thermally degraded.

Therefore, the above method specifically improves the service life of the thermistor element.

DESCRIPTION OF PREFERRED EMBODIMENTS

Figure 5:
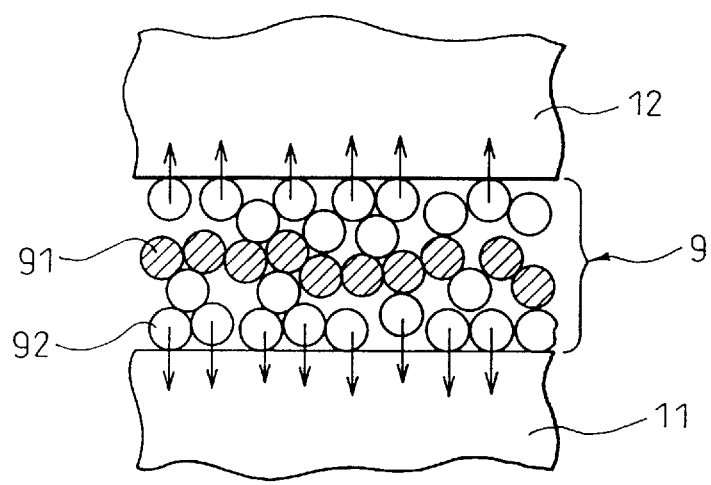
FIG. 5 is a schematic view for explaining the problem of a thick film type of a high-temperature thermistor in the prior art.

The problems to be solved by the present invention will be further explained with reference to a thick film type of a high-temperature thermistor as shown in FIG. 5.

As shown in FIG. 5, the thermistor material 9 in the high-temperature thermistor is covered by a substrate 11 and a cover 12 comprising a ceramic. The ceramic can mainly utilize alumina.

As shown in FIG. 5, the $(Mn.Cr)$ $O_4$ particles 92 and the $YCrO_3$ particles 91 in the thermistor material 9 of a prior art separate easily. The $(Mn.Cr)$ $O_4$ particles 92 have high reactivity with alumina, while the $YCrO_3$ particles 91 hardly react with alumina.

As shown in FIG. 5, since the diffusion of the $(Mn.Cr)$ $O_4$ particles 92 occurs gradually in the above high-temperature thermistor material 9 during the passage of time, the $YCrO_3$ particles migrate into the inner portion of the thermistor material and the $(Mn.Cr)$ $O_4$ particles 92 migrate into the outer portion of the thermistor material. Therefore, the $(Mn.Cr)$ $O_4$ particles 92 concentrate at the interfaces between the ceramic substrate 11 and the thermistor material and between the cover 12 and the thermistor material.

When this state proceeds further, the (Mn.Cr) $O_4$ particles 92 may diffuse into the inner portions of the ceramic substrate 11 and the cover 12 comprised of alumina.

As the natural consequence, since the thermistor properties of the material 9 are controlled by the $YCrO_3$ particles 91, both the resistivity and the high temperature coefficient of resistance are gradually lowered.

Now an explanation of the present invention for overcoming the above-mentioned difficulties will be provided.

EXAMPLE 1

A high-temperature thermistor material, a method for manufacturing of the material and a high-temperature thermistor using the thermistor material regarding a first embodiment of the present invention will be explained with reference to FIGS. 1 and 2.

The high-temperature thermistor material according to the present invention is a high-temperature thermistor material comprising $(Mn_x.Cr_y)$ $O_4$ spinel and Y(Cr.Mn) $O_3$ perovskite.

In the method for manufacturing the high-temperature thermistor material according to the present invention, firing and then reacting the mixed powder comprising (Mn.Cr) $O_4$ spinel powder and $Y_2O_3$ powder is done at a temperature of 1400° to 1700° C.

A construction of a high-temperature thermistor is explained in the following.

Figure 1:
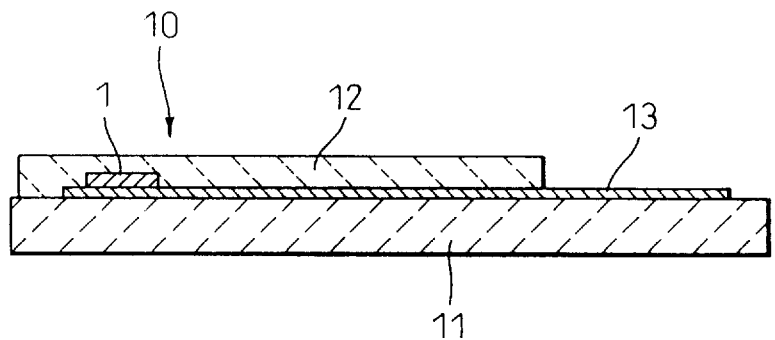
FIG. 1 is a cross sectional plan view of a thick film type of a high-temperature thermistor in example 1.

As shown in FIG. 1, the high-temperature thermistor 10 of example 1 is a thick film type of a thermistor. The high-temperature thermistor of a laminate structure comprises a ceramic substrate 11 containing alumina, a layer or a high-temperature thermistor material 1 on the ceramic substrate 11 comprising alumina, and a ceramic cover 12 comprising alumina on the thermistor layer 1.

Further, the electrodes 13 are mounted on the substrate 11 and contact the high-temperature material 1.

Portions of the electrodes 13 extend outside the cover 12.

The method for manufacturing the high-temperature thermistor 10 follows. The high temperature thermistor 10 of the present invention has the substrate 11 and the cover 12 comprising alumina. A calcining of the thermistor material 1 and sintering of the substrate 11 and the cover 12 are simultaneously performed in the method of the present invention.

When the mole ratio of Cr/Mn in the mixture containing $Cr_2O_3$ and $MnO_2$ is 1:1, the weight of $Cr_2O_3$ was 46.7 g and the weight of $MnO_2$ was 53.3 g.

Both powders were charged in a pot-mill and pre-fired for 12 hours at 1100° C. The (Mn.Cr) $O_4$ spinel was obtained thereby.

Then, (Mn.Cr) $O_4$ spinel of 50 mole % and the $Y_2O_3$ of 50 mole % were mixed to obtain a mixture of 100 mole %. In other words, 49.8 g of (Mn.Cr) $O_4$ spinel and 50.2 g of $Y_2O_3$ were mixed.

To 100 mole % (100 g) of the mixed powders of (Mn.Cr) $O_4$ spinel and $Y_2O_3$, Si.Ca.O (calcium silicate) of 10 mole % (5.2 g) (so-called outer mole %) as a sintering auxiliary was added. Furthermore, an organic vehicle (solution dissolved ethyl in terpineol) of 25 g was added to the mixture. Thereby, a paste state of the thermistor was provided.

Further, a ceramic green sheet, being substrate 11 after firing, was prepared. Pt paste was printed on the ceramic green sheet and then thermistor paste was also printed thereon. After coating these two pastes layer on the ceramic green sheet, another ceramic green sheet, being the cover 12 after firing, was laminated on these pastes (see FIG. 1).

After the resultant laminated body was fired with the ceramic green sheets at temperature of 1550° C. and the (Mn.Cr) $O_4$ spinel and the $Y_2O_3$ were reacted together, a sintered mixture body comprising $(Mn_x.Cr_y)$ $O_4$ spinel and Y(Cr.Mn) $O_3$ perovskite was provided.

Thus, it was possible to prepare the high-temperature thermistor 10 as shown FIG. 1.

The operation of the thermistor material of example 1 is described as follows.

In the methods of the present invention, the thermistor material comprises $(Mn_x.Cr_y)$ $O_4$ spinel and Y(Cr.Mn) $O_3$ perovskite, is obtained from the mixed powder comprising the (Mn.Cr) $O_4$ spinel powder and the $Y_2O_3$ powder.

Due to the mixture of the both of the powders, which is followed by firing, some of the Mn atoms and the Cr atoms (Mn ions and Cr ions) migrate toward the $Y_2O_3$ in (Mn.Cr) spinel. Then, these atoms react with the $Y_2O_3$, and form Y(Cr.Mn) $O_3$ perovskite.

This process causes a bonding force between $(Mn_x.Cr_y)$ $O_4$ spinel and Y(Cr.Mn) $O_3$ perovskite to increase to a level which cannot be obtained in the prior art. This bonding force can exist stably in the uniformly dispersed structure of the $(Mn_x.Cr_y)$ $O_4$ spinel and the Y(Cr.Mn) $O_3$ perovskite.

Thus, according to the better thermistor material of the present invention, a uniformly mixed state between $(Mn_x.Cr_y)$ $O_4$ spinel and Y(Cr.Mn) $O_3$ perovskite is always maintained, thereby stabilizing the thermistor property.

The high-temperature thermistor 10 is a thick film type of high-temperature thermistor. When such a thermistor is formed from conventional thermistor material, it is impossible to obtain stable properties in the thermistor.

When such a thermistor is made of the thermistor material of the present invention, the separation of $(Mn_x.Cr_y)$ $O_4$ spinel and Y(Cr.Mn) $O_3$ perovskite does not occur in the thermistor material. Thereby, it is possible to prevent the (Mn.Cr) $O_4$ spinel from dispersing into the substrate 11 and the cover 12 containing alumina such as in the prior art.

Thus, high-temperature thermistors of the present invention can provide the stable thermistor properties.

The high-temperature thermistor properties of the present invention are explained in comparison with comparative example C1.

The thermistors of the present invention employ the thermistor materials of the specimen No. 1 to No. 6 in Table 1. The addition (mole %) of $Y_2O_3$ in Table 1 describes the value of the mole % based on a total mole % (100 mole %) of both (Mn.Cr) $O_4$ spinel powder and $Y_2O_3$ powder. The Ca.Si.O added amount of specimen No. 6 is expressed by mole % (outer mole %) with respect to the above total amount of the mixture (100 mole %).

The specimens No. 1 to No. 6 were manufactured by the above method.

Comparative specimen C1 is high-temperature thermistor that uses thermistor material made by a conventional method.

A powder of $Mn_{1.5}Cr_{1.5}O_4$ spinel was obtained by mixing both $Cr_2O_3$ and $Y_2O_3$ of the Cr/Mn mole ratio of 1:1, pre-firing at a temperature of 1100° C. to 1300° C., and then powdering.

In the same manner as the above, a powder of $YCrO_3$ perovskite was obtained by mixing both $Cr_2O_3$ and $Y_2O_3$ of the Cr/Y mole ratio of 1:1, pre-firing at a temperature of 1100° C. to 1300° C. and then powdering.

The high-temperature thermistor shown FIG. 1 was obtained by mixing the above material, and by the above method, without thermistor paste.

The measurements of the thermistor properties of the specimens No. 1 to No. 6 and the comparative specimen C1 are shown below.

The resistance of the specimens were measured at temperatures of 500° C. and of 700° C. and the temperature coefficient of resistance shown in Table 1 was calculated from these measured resistances.

Further, the resistivities of the specimens shown in FIG. 1 were measured.

The high-temperature durabilities of specimens No. 1 to No. 6 and the comparative specimen C1 were measured as follows.

The resistance of the specimens No. 1 to No. 6 and the comparative specimen C1 were measured at a temperature of 700° C. Then, the specimens No. 1 to No. 6 and the comparative specimen C1 were inserted into a furnace and were heated for 1000 hours at a temperature of 1000° C. After taking out the specimens, the resistance of each specimen No. 1 to No. 6 and of comparative specimen C1 were measured again at a temperature of 700° C.

A term "resistance value change ratio" is now introduced, which is defined by the following formula:

(RG/RM)−1 where RM is resistance before heating and RG is resistance after heating. The percentage of this value is shown in Table 1.

Figure 2:
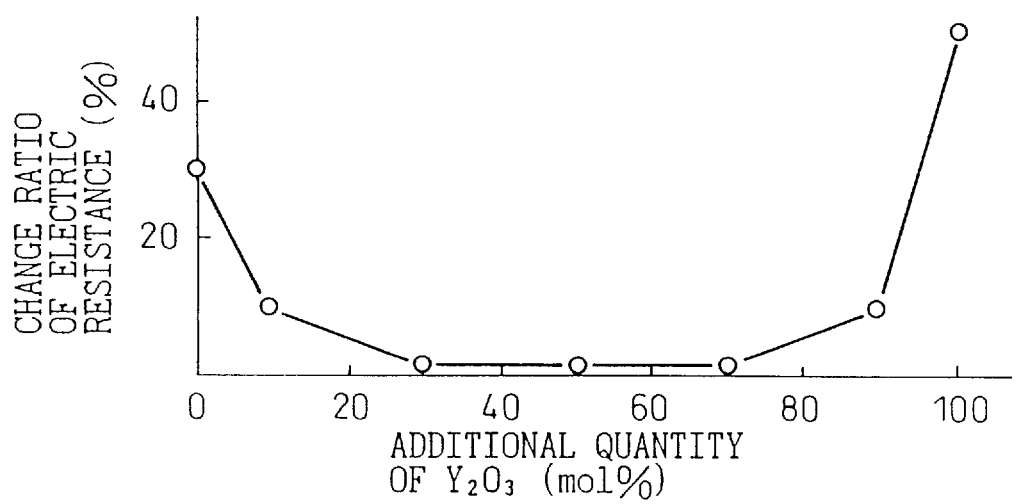
FIG. 2 is a diagrammatic view for explaining the relation between change ratio of electric resistance and added quantity of $Y_2O_3$ in example 1.

FIG. 2 shows the relationship between change ratio of electric resistance plotted on the abscissa and an added quantity of $Y_2O_3$ plotted on the ordinate.

As shown in Table 1, each change ratio of electric resistance of specimen Nos. 1 to 6 is lower. Thus, it became clear that resistance of each specimen Nos. 1 to 6 was scarcely changed before or after being heated.

Thereby, the thermistor materials of the present invention have stable properties at high temperatures.

On the contrary, it is clear that the material of the conventional example C1 has very high change ratio, in the order of +45, and has unstable thermistor properties at high temperatures.

Therefore, the thermistor material of specimens No. 1 to No. 6 of the present invention allow the temperature to be detected precisely at a high temperature circumstance which is matched to the actual use of the thermistor.

The materials of specimens 1, 2, 5 and 6 are thermistor materials of the present invention and contain the different volumes of $Y_2O_3$. The resistivities of materials of specimens 1, 2, 5 and 6 are in range of 80 to 1940 Ωcm.

Thus, according to the thermistor materials of the present invention, a change in the added amount of $Y_2O_3$ allows the value of resistivity to be varied over a wide range.

Based on the result of specimens 2, 3 and 5, it is clear that the resistivity can change from 105 to 1060 Ωcm by changing the Mn and Cr mole ratio in $(Mn_x.Cr_y) O_4$.

Therefore, according to the thermistor materials of the present invention, a change of the mole ratio between Mn and Cr in $(Mn_x.Cr_y) O_4$ allows the resistivity to be varied over a wide range.

TABLE 1

| No. | Cr/Mn mole ratio | $Y_2O_3$ loading (mole %) | Ca.Si.O loading (outer %) | temperature coefficient of resistance (K) | resistivity (700° C.) (Ωcm) | resistance** change ratio (700° C.) (%) |
|---|---|---|---|---|---|---|
| 1 | 0.5/0.5 | 30 | | 8500 | 1940 | +3 |
| 2 | 0.5/0.5 | 50 | | 6800 | 340 | +2 |
| 3 | 0.6/0.4 | 50 | | 7500 | 1060 | +2 |
| 4 | 0.4/0.6 | 30 | | 6000 | 105 | +2 |
| 5 | 0.5/0.5 | 70 | | 5200 | 80 | +1 |
| 6 | 0.5/0.5 | 50 | 10 | 7000 | 240 | +1 |
| C1 | 0.5/0.5 | 50* | | 8000 | 2500 | +45 |

*$YCrO_3$
**after durability test of 1000 hours at 1100° C.

EXAMPLE 2

Figure 3:
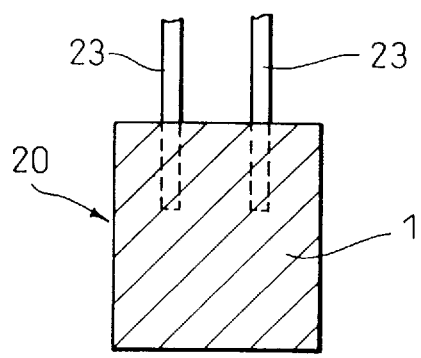
FIG. 3 is a view for explaining a bulk type of a thermistor element in example 2.

As shown in FIG. 3, this example is a bulk-type of thermistor element 20 that uses the thermistor material of specimen 1.

The above thermistor element formed of the thermistor material of specimen 1 had two electrodes 23 that were embedded in the thermistor element.

A method for manufacturing the thermistor element 20 of example 2 is described below.

A mixture of 100 mole % from (Mn.Cr) $O_4$ spinel of 50 mole % and the $Y_2O_3$ of 50 mole % was obtained. In other words, 49.8 g of (Mn.Cr) $O_4$ spinel and 50.2 g of $Y_2O_3$ were mixed.

To the above mixture of 100 mole % (weight of 100 g), Si.Ca.O (calcium silicate) of 10 mole % (5.2 g) (outer mole %) as a sintering auxiliary was added. Then, to the mixture, an organic binder (10% solution of compound PVA (polyvinyl alcohol)) of 10 g was added.

From the obtained powder mixture, a product of a desired shape as shown in FIG. 3 is produced. When the powder was formed, two Pt wires, being electrodes 23, were embedded in the formed powder.

Then, since the resultant formed body was fired at temperature of 1550° C. and the (Mn.Cr) $O_4$ spinel and the $Y_2O_3$ reacted together, it became a sintered mixture body comprising $(Mn_x.Cr_y) O_4$ spinel and $Y(Cr.Mn) O_3$ perovskite.

Thus, a high-temperature thermistor element 20, as shown FIG. 3, was prepared.

Regarding the other aspects, example 2 was identical with example 1.

The operation of the thermistor material of example 2 is the same as that of example 1.

EXAMPLE 3

Figure 4:
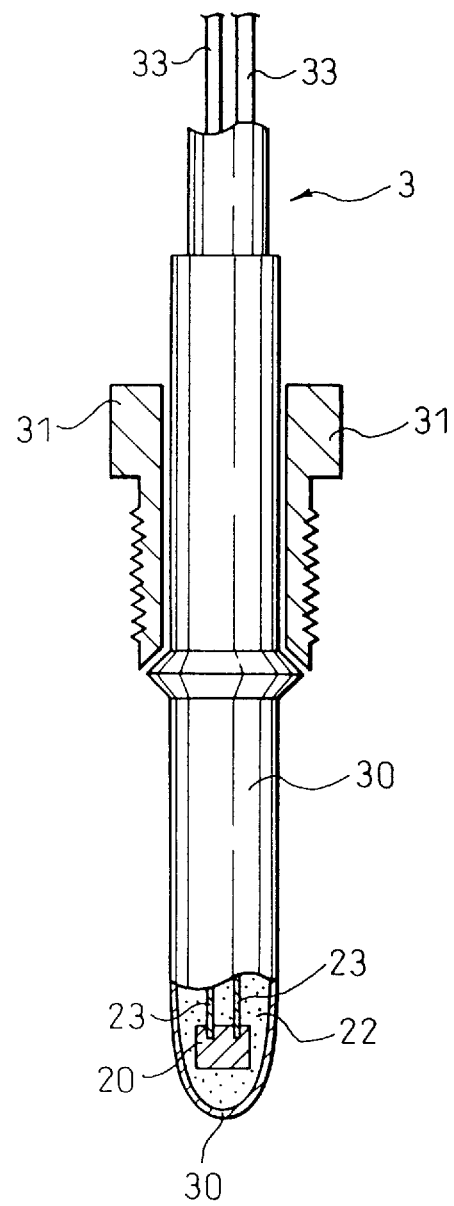
FIG. 4 is a cross sectional plan view of a high-temperature thermistor in example 3.

As shown FIG. 4, example 3 is a temperature measuring instrument for the exhaust gas of motor vehicles that uses a high-temperature thermistor of the present invention.

The temperature measuring instrument for exhaust gas is a high-temperature thermistor 3 that is a bulk type high-temperature thermistor element 20, as shown in example 2, sealed in a metallic tube and held in place by cement 20.

Two electrodes 23, extending from the high-temperature thermistor element, were connected to lead wires 33 in the metallic tube 30. The output signal of the high-temperature thermistor is taken out by the lead wires 33.

The reference number 31 shows a housing.

The other apportion of this embodiment also is similar that of example 1.

Regarding the high-temperature thermistor 3 as a temperature measuring instrument for exhaust gas, the thermistor element 20 is stored in a metallic tube. Therefore, it prevents exposure of the thermistor element 20 to exhaust gas.

This embodiment specifically improves service life of the thermistor element 20.

The operation of the thermistor material of this embodiment is similar to that of example 1.

I claim:

1. A method of manufacturing high-temperature thermistor materials, comprising the steps of:

mixing powders of $(Mn.Cr)O_4$ spinel powder and $Y_2O_3$ powder to form a mixed powder, and firing the mixed powder at a temperature of from 1400° C. to 1700° C. to react components of the mixed powder with each other and generate $(Mn_x.Cr_y)O_4$ spinel and $Y(Cr.Mn)O_3$ perovskite, wherein $0<x$, $y \leq 2$, and $x+y=3$.

2. A method according to claim 1, wherein the concentration of the $Y_2O_3$ powder is from 10 to 90 mole% relative to the total quantity of the $(Mn.Cr)O_4$ spinel powder and the $Y_2O_3$ powder in the mixed powder.

3. A method according to claim 1, wherein the molar ratio of Mn:Cr in the $(Mn.Cr)O_4$ spinel powder in the mixed powder is from 0.11 to 9.0.

* * * * *